Dec. 14, 1965    D. KOLTS ET AL    3,222,783
PINKING SHEARS FOR MAKING PLEATS
Filed March 21, 1963
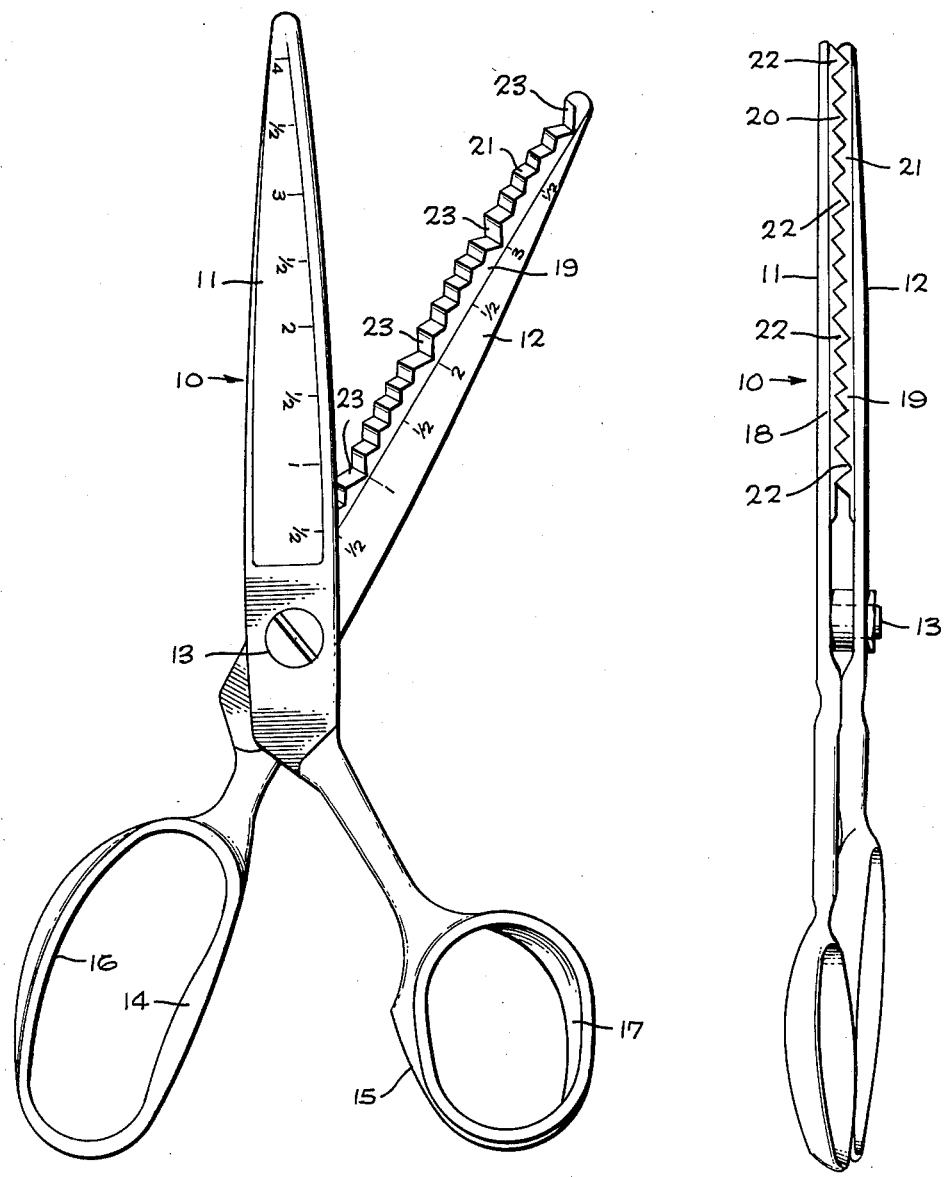
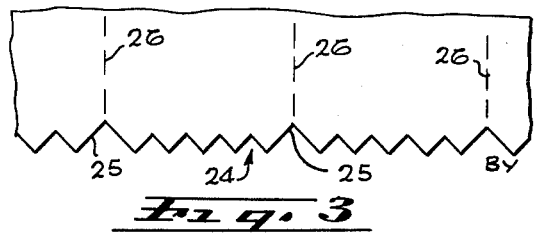
INVENTORS
HELEN R. HUNGER
DONALD KOLTS
ATTORNEYS United States Patent Office 3,222,783
Patented Dec. 14, 1965

3,222,783
PINKING SHEARS FOR MAKING PLEATS
Donald Kolts and Helen R. Hunger, both of
417 S. Hill St., Los Angeles, Calif.
Filed Mar. 21, 1963, Ser. No. 267,052
2 Claims. (Cl. 30—230)

This invention relates to cutting tools and more especially to shears for marking layout lengths such as for making pleats.

In the making of fabric articles such as dresses, skirts, curtains, draperies and the like, a problem of considerable significance has heretofore been presented, that of providing satisfactory means for marking distances on the material, such as when laying out pleats. Customarily the goods must be marked or the temporary folds secured by pinning or stitchings and such methods are inefficient and leave much to be desired.

In this type of work the edge of the goods is usually serrated by the use of pinking shears, however, pinking shears as presently used do not provide means for marking the goods to indicate fold lines for the formation of the several pleats. The present invention has been directed to this problem and to finding its solution in the provision of a pinking shears construction wherein one or more pairs of the teeth of the shears are of greater length than the remainder and thus definitely mark the goods at spacings where the pleats are to be formed.

It is therefore the primary purpose and objective of this invention to provide a novel cutting tool or implement for making a pinking cut in fabric materials and simultaneously marking the goods to indicate where to fold the material to form pleats.

Another object of the invention is to provide improvements in pinking shears having a pair of spaced tooth formations of modified form for marking the goods for making pleats.

An additional object of the invention is to provide improvements in pinking shears, as in the previous object, wherein the shears have a plurality of pairs of spaced teeth of larger size than the remainder and uniformly spaced for marking fabrics to identify the places where pleats are to be formed.

With these and other objects in mind the present invention is set forth more fully in the following specification reference being had to the accompanying drawing.

In the drawing:

FIGURE 1 is a side view of a pair of pinking shears embodying the present invention;

FIGURE 2 is an edge view of the same;

FIGURE 3 is a fragmentary view of a section of fabric, illustrating the operation of the shears of FIGURES 1 and 2.

Referring more particularly to the drawing and especially to FIGURES 1 and 2 the pinking shears of this invention are indicated generally at 10 and are formed with a pair of blades 11 and 12 which are pivotally secured together by a bearing bolt 13. Blades 11 and 12 are formed with handles 14 and 15, respectively, which handles have the conventional finger guards 16 and 17.

Blade 11 is formed with a flange 18 and blade 12 is formed with a similar flange 19, these flanges extending toward each other, as clearly shown in FIGURES 1 and 2. Flanges 18 and 19 are formed with a plurality of substantially V-shaped teeth 20 and 21, respectively, which teeth have a complementary interfitting engagement formation for making a pinking cut in the fabric goods. Flange 18 has a plurality of marking teeth 22 which are uniformly spaced along the flange and these teeth are longer than the intervening teeth 20. Flange 19 is formed with a similar plurality of notches 23 in which the teeth 22 interfit. Die cut markers 26 are shown on blades 11 and 12 and laid out in inches and fractions to indicate length or distance between marking teeth 22. If desired, the small teeth 20 and 21 may be omitted and measured straight cuts made and identified between any two consecutive teeth 22.

FIGURE 3 illustrates the operation of the invention. When laying out pleats a pinking cut is made, thus forming the normal serrated edge 24 by the normal sized teeth 20 and 21 and simultaneously, pairs of spaced notches 25 of larger size are made by longer teeth 22. These notches 25 thus identify and serve as markers for lines 26 which will indicate where the fold lines for the pleats are to be made.

While we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent devices and methods.

In the claims:

1. In pinking shears as described, a pair of pivotally connected blades having a series of interengaging cutting teeth and notches, a plurality of spaced pairs of said teeth and complementary notches which are longer than the others whereby to mark a plurality of predetermined lengths of a cut made by said shears.

2. In pinking shears for forming pleats as described, a pair of pivotally connected blades having a series of interengaging cutting teeth and notches, a remotely spaced pair of said teeth and complementary notches being longer than the others whereby to mark and identify a predetermined length of a cut made by said shears.

References Cited by the Examiner
UNITED STATES PATENTS

| | | | |
|---|---|---|---|
| 489,406 | 1/1893 | Austin | 30—230 |
| 536,086 | 3/1895 | Krank | 30—131 X |
| 2,491,712 | 12/1949 | Campbell | 30—229 |
| 2,794,249 | 6/1957 | Mainhardt et al. | 30—229 |

WILLIAM FELDMAN, *Primary Examiner.*